United States Patent
Frank et al.

(10) Patent No.: US 8,244,418 B1
(45) Date of Patent: Aug. 14, 2012

(54) SYSTEM AND METHOD FOR GENERATING ALERT SIGNALS IN A WEATHER AWARENESS AND WARNING SYSTEM

(75) Inventors: David A. Frank, North Liberty, IA (US); Lu Zhang, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 824 days.

(21) Appl. No.: 12/217,457

(22) Filed: Jul. 3, 2008

(51) Int. Cl.
*G01W 1/00* (2006.01)
*G08B 21/00* (2006.01)

(52) U.S. Cl. .......................... 701/14; 701/301; 701/436

(58) Field of Classification Search .................... 701/14, 701/301, 300, 213, 3, 436, 415, 423; 340/901, 340/945
See application file for complete search history.

(56) References Cited

U.S. PATENT DOCUMENTS

| | | | | |
|---|---|---|---|---|
| 6,597,305 B2 * | 7/2003 | Szeto et al. | ................. | 342/26 R |
| 6,828,922 B1 * | 12/2004 | Gremmert et al. | ............ | 340/949 |
| 6,865,452 B2 * | 3/2005 | Burdon | ............................ | 701/3 |
| 6,917,297 B2 * | 7/2005 | Andrews et al. | ............... | 340/601 |
| 6,917,860 B1 * | 7/2005 | Robinson et al. | ................ | 701/3 |
| 7,027,898 B1 * | 4/2006 | Leger et al. | ..................... | 701/14 |
| 7,109,913 B1 * | 9/2006 | Paramore et al. | ........... | 342/26 B |
| 7,411,541 B2 * | 8/2008 | Khatwa | ........................ | 342/26 R |
| 7,471,995 B1 * | 12/2008 | Robinson | ........................... | 701/3 |
| 7,656,343 B1 * | 2/2010 | Hagen et al. | ................ | 342/26 B |
| 7,664,601 B2 * | 2/2010 | Daly, Jr. | ............................. | 702/3 |
| 7,667,621 B2 * | 2/2010 | Dias et al. | ..................... | 340/963 |
| 8,059,024 B2 * | 11/2011 | Christianson | ............... | 342/26 B |
| 8,068,050 B2 * | 11/2011 | Christianson | ................ | 342/26 B |
| 8,130,121 B2 * | 3/2012 | Smith et al. | .................... | 340/945 |
| 2003/0016156 A1 * | 1/2003 | Szeto et al. | ...................... | 342/26 |
| 2004/0183695 A1 * | 9/2004 | Ruokangas et al. | .......... | 340/945 |
| 2004/0239550 A1 * | 12/2004 | Daly, Jr. | ....................... | 342/26 B |
| 2004/0246145 A1 * | 12/2004 | Andrews et al. | .............. | 340/971 |
| 2007/0005249 A1 * | 1/2007 | Dupree et al. | .................... | 702/3 |
| 2007/0162197 A1 * | 7/2007 | Fleming | .......................... | 701/10 |
| 2008/0158049 A1 * | 7/2008 | Southard et al. | ............ | 342/26 R |
| 2008/0165051 A1 * | 7/2008 | Khatwa | ......................... | 342/26 B |
| 2008/0183344 A1 * | 7/2008 | Doyen et al. | ....................... | 701/9 |
| 2010/0194628 A1 * | 8/2010 | Christianson et al. | ...... | 342/26 B |

\* cited by examiner

*Primary Examiner* — Khoi Tran
*Assistant Examiner* — Jason Holloway
(74) *Attorney, Agent, or Firm* — Donna P. Suchy; Daniel M. Barbieri (57) ABSTRACT

A weather awareness and warning system ("WAWS") provides aircraft position data and weather data input to a weather alert ("WA") processor from a navigation system and a datalink system. The weather data contains three-dimensional delineations of a defined weather area. The WA processor determines an aircraft alert position and a weather alert zone; if the aircraft alert position falls within or penetrates the weather alert zone, the WA processor generates an alert signal and provides a weather alert signal to an alerting system comprising of visual alert(s) displayed on a display unit such as an HDD unit or a HUD unit, or an aural alert sounded by an aural alert unit. The aircraft alert position and weather alert zone could be determined by the WA processor by executing an algorithm(s) embedded in software containing the disclosed embodiments and methods.

20 Claims, 11 Drawing Sheets

SYSTEM AND METHOD FOR GENERATING ALERT SIGNALS IN A WEATHER AWARENESS AND WARNING SYSTEM

BACKGROUND OF THE INVENTION

1. Field of the Invention

This invention pertains to the field of alert signals being provided to the pilot of an aircraft, where such signals are generated by a weather awareness and warning system.

2. Description of the Related Art

Knowledge of real-time weather is an important safety concern to the pilot or flight crew of an aircraft. During an extended or cross-country flight, an aircraft could encounter weather conditions that affect a specific region but not all regions. There are many sources of weather data. Governmental agencies and many private organizations report and forecast the weather. Although a weather forecast may be considered a computer-generated best guess, it is important for pilots to use all available weather data from real time to forecasts before and during the flight to make decisions that maintain safety in the skies.

For an aircraft in flight, weather data may be transmitted through a datalink system that could originate from or be provided by a plurality of sources including, but not limited to, XM Satellite Radio, Inc., a provider of satellite weather data services. Data representative of weather conditions may be continuously broadcast via a satellite datalink system. Weather data that may be broadcast could include data contained in a variety of weather products such as, but not limited to, Significant Meteorological Information ("SIGMET"), Airmen's Meteorological Information ("AIRMET"), Aviation Routine Weather Report ("METAR"), Next-Generation Radar ("NEXRAD"), surface analysis weather maps, surface pressure, surface wind speed and direction, winds aloft, wind shear detection, echo tops, and freezing levels.

Weather products contain meteorological data which could convey aviation hazards which, in turn, could affect the safe operations of an aircraft in flight. SIGMETs are weather products that could provide notice to aircrews or a user of an aircraft of potentially hazardous en route phenomena such as, but not limited to, thunderstorms and hail, turbulence, icing, sand and dust storms, tropical cyclones, and volcanic ash. In the United States, there are two types of SIGMETs: non-convective and convective. AIRMETs are weather products that could provide a concise description of the occurrence or expected occurrence in time and space of specified en route weather phenomena. Although intensities may be lower than those of SIGMETS, the weather phenomena could still affect the safety of aircraft operations such as, but not limited to, icing, turbulence, strong surface winds and low-level wind shear, instrument meteorological conditions requiring pilots to fly primarily on instruments (e.g., low ceiling or visibility), and mountain obscuration. METARs are weather products based upon surface observations at a location that could provide information such as, but not limited to, wind visibility, runway visual range, present weather phenomena, sky conditions, temperature, dew point, and altimeter setting. NEXRADs are weather products based upon Doppler weather radar that could provide information such as, but not limited to, precipitation and atmospheric movement or wind.

Real-time weather information could be provided to a pilot or flight crew through an integrated flight information system ("IFIS") such as the IFIS developed by Rockwell Collins, Inc. Through an IFIS, a pilot may instantly access weather data such as, but not limited to, graphical weather, winds aloft, icing, turbulence and strategic information that could affect an aircraft in flight. With IFIS, a pilot has a powerful tool to help him or her make more strategic decisions about their flight plans. By combining strategic weather information with an airborne weather radar system, situational awareness is enhanced by providing a pilot with the bigger, real-time weather picture during flight.

BRIEF SUMMARY OF THE INVENTION

The embodiments disclosed herein present novel and non-trivial systems and methods for generating and providing alerts in a weather awareness and warning system ("WAWS"). As disclosed herein, a WAWS provides safety and situational awareness of the pilot of an aircraft by generating one or more alert signals associated with an aircraft operating near a weather area defined in one or more weather products. As embodied herein, a weather alert ("WA") processor may determine an aircraft alert position based upon the position of the aircraft and a weather alert zone based upon a defined weather area. A manufacturer or end-user may also include a leading distance to aircraft position in its determination of an aircraft alert position and a buffer zone to a defined weather area in its determination of a weather alert zone. As embodied herein, if an aircraft alert position falls within a weather alert zone, a WA processor may generate an alert signal commensurate or associated with the severity of the alert and provide such signal to an alerting system.

In one embodiment, a system for generating a weather alert signal in a WAWS is disclosed. The system could be comprised of data sources for providing aircraft position data and weather data to a WA processor. The WA processor could determine an aircraft alert position and a weather alert zone, generate a weather alert signal if the aircraft alert position falls within the weather alert zone, and provide the signal to an alerting system. The alerting system could provide one or more visual alerts on a display unit such as, but not limited to, a Head-Down Display ("HDD") unit or Head-Up Display ("HUD") unit, one or more alerts originating from an aural alert system, or any combination thereof.

In another embodiment, a method for generating a weather alert signal in a WAWS is disclosed. The method could be comprised of a WA processor receiving aircraft position data and weather data, determining an aircraft alert position and weather alert zone, generating a weather alert signal if the aircraft alert position falls within the weather alert zone, and providing the weather alert signal to an alerting system comprising of at least one alerting unit including, but not limited to, an HDD unit, a HUD unit, an aural alert unit, or any combination thereof.

BRIEF DESCRIPTION OF THE DRAWINGS

FIG. 7C illustrates a three-dimensional depiction of delineations described in the AIRMET of FIG. 7A.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
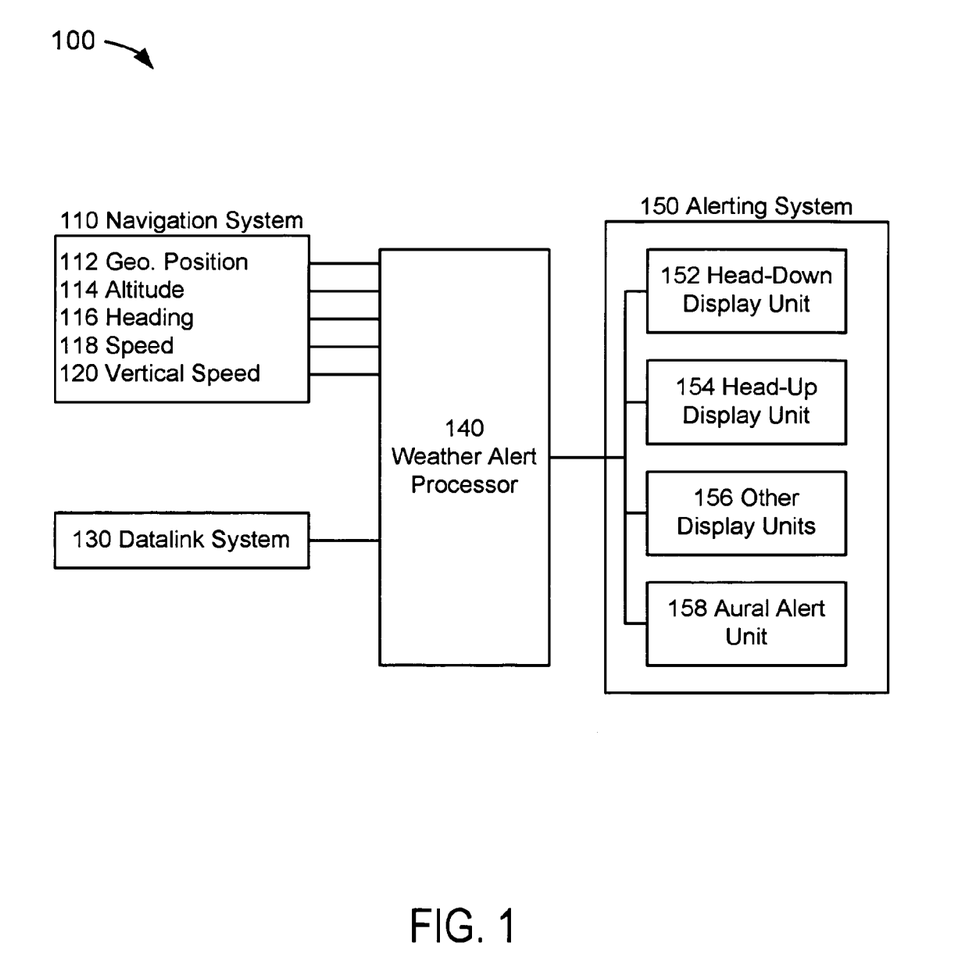
FIG. 1 depicts a block diagram of a system for generating an alert signal in a WAWS.

FIG. 1 depicts a block diagram of a weather awareness and warning system ("WAWS") 100 suitable for implementation of the techniques described herein. A WAWS 100 of an embodiment of FIG. 1 includes a navigation system 110, a datalink system 130, a weather alert ("WA") processor 140, and an alerting system 150.

In the embodiment of FIG. 1, a navigation system 110 comprises the system or systems that could provide navigation information or data in an aircraft. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system (or satellite navigation system), and a flight management computing system, all of which are known to those skilled in the art. A navigation system 110 could provide navigation data including, but not limited to, geographic position 112, altitude 114, heading 116, speed 118, and vertical speed 120. As embodied herein, aircraft position data provided by a satellite navigation system may comprise of geographic position 112 (e.g., latitude and longitude coordinates) and altitude 114. Heading 116, speed 118, and vertical speed 120 may be derived using data representative of either geographic position, aircraft position, or a combination thereof. As embodied herein, a navigation system 110 could provide navigation data including, but not limited to, geographic position 112, altitude 114, heading 116, speed 118, and vertical speed 120 to a WA processor 140 for subsequent processing as discussed herein.

A datalink system 130 includes those systems that receive data from sources external to the aircraft including, but not limited to, ground stations and satellites. In an embodiment of FIG. 1, data representative of weather information could be transmitted to the pilot or flight crew of an aircraft via a datalink system 130 which could provide weather information data to a WA processor 140 for subsequent processing as discussed herein.

Weather data transmitted through a datalink system could originate from or be provided by a plurality of weather data sources including, but not limited to, XM Satellite Radio, Inc. and Universal Weather and Aviation, Inc. Data representative of weather conditions may be continuously broadcast via a satellite datalink system. Weather data that may be broadcast could include data contained in a variety of weather products such as, but not limited to, Significant Meteorological Information ("SIGMET"), Airmen's Meteorological Information ("AIRMET"), Aviation Routine Weather Report ("METAR"), Next-Generation Radar ("NEXRAD"), surface analysis weather maps, surface pressure, surface wind speed and direction, winds aloft, wind shear detection, echo tops, and freezing levels.

As embodied herein, weather products contain meteorological data which could convey aviation hazards which, in turn, could affect the safe operations of an aircraft in flight. As embodied herein, SIGMETs are weather products that could provide notice to aircrews or a user of an aircraft of potentially hazardous en route phenomena such as, but not limited to, thunderstorms and hail, turbulence, icing, sand and dust storms, tropical cyclones, and volcanic ash. In the United States, there are two types of SIGMETs: non-convective and convective. Examples of each are provided below.

Another weather product containing meteorological data which could convey aviation hazards is an AIRMET. As embodied herein, AIRMETs are weather products that could provide a concise description of the occurrence or expected occurrence in time and space of specified en route weather phenomena. Although intensities may be lower than those of SIGMETS, the weather phenomena could still affect the safety of aircraft operations such as, but not limited to, icing, turbulence, strong surface winds and low-level wind shear, instrument meteorological conditions requiring pilots to fly primarily on instruments (e.g., low ceiling or visibility), and mountain obscuration. An example of an AIRMET is provided below.

A WA processor 140 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A weather alert processor 140 may be driven by the execution of software or computer instruction code containing algorithms developed for the specific functions embodied herein; alternatively, a weather alert processor 140 may be implemented as an application-specific integrated circuit (ASIC). Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing unit. As embodied herein, a WA processor 140 could be a processor(s) used by or in conjunction with any other system of the aircraft including, but not limited to, a processor(s) associated with a synthetic vision system ("SVS"), an enhanced vision system ("EVS"), a combined SVS-EVS, a flight management computing system, an aircraft collision avoidance system, an airspace awareness and warning system, a terrain awareness and warning system, or any combination thereof.

A WA processor 140 may receive input data from various systems including, but not limited to, a navigation system 110 and a datalink system 130. A WA processor 140 may be operatively coupled or electronically coupled to a navigation system 110 and a datalink system 130 to facilitate the receipt of input data; as embodied herein, operatively coupled may be considered as interchangeable with electronically coupled. A WA processor 140 may provide output data to various systems including, but not limited to, an alerting system 150. A WA processor 140 may be electronically coupled to an alerting system 150 to facilitate the providing of output data. It is not necessary that a direct connection be made; instead, such receipt of input data and the providing of output data could be provided through, but not limited to, a data bus or through a wireless network.

An alerting system 150 could include those systems that provide, in part, visual and aural stimuli presented to attract attention and convey information regarding system status or condition. An alerting system 150 may include, but is not limited to, a display unit for producing visual alerts and an aural alert unit for producing aural alerts. Visual alerts may be information that is projected or displayed on a cockpit display unit to present a condition, situation, or event to the pilot. Aural alerts may be discrete sounds, tones, or verbal statements used to annunciate a condition, situation, or event to the pilot. In addition, alerts may be based on conditions requiring immediate crew awareness or attention. Caution alerts may be alerts requiring immediate crew awareness that the aircraft is approaching a defined weather area, e.g., a weather area defined in a SIGMET or an AIRMET. Warning alerts may be alerts requiring immediate crew attention that the aircraft has entered a defined weather area. Both caution and warning alerts may be presented as visual alerts, aural alerts, or combination thereof. When providing visual alerts, one or more colors may be presented on a display unit indicating one or more levels of alerts. For instance, amber or yellow may indicate a caution alert, and red may indicate a warning alert.

In an embodiment of FIG. 1, an alerting system 150 could comprise of one or more display units that may provide tactical flight information. As embodied herein, tactical flight information could be information relevant to the instant or immediate control of the aircraft, whether the aircraft is in flight or on the ground. Display units may include, but are not limited to, Head-Down Display ("HDD") 152 and Head-Up Display ("HUD") 154 units. An HDD unit 152 is typically a unit mounted to an aircraft's flight instrument panel located in front of a pilot and below the windshield and the pilot's field of vision. An HDD unit 152 could display the same information found on a primary flight display ("PFD"), such as "basic T" information (i.e., airspeed, attitude, altitude, and heading). Although it provides the same information as that of a PFD, an HDD unit 152 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. An HDD unit 152 is designed to provide flexible configurations which may be tailored to the desired configuration specified by a buyer or user of the aircraft.

Figure 2A:
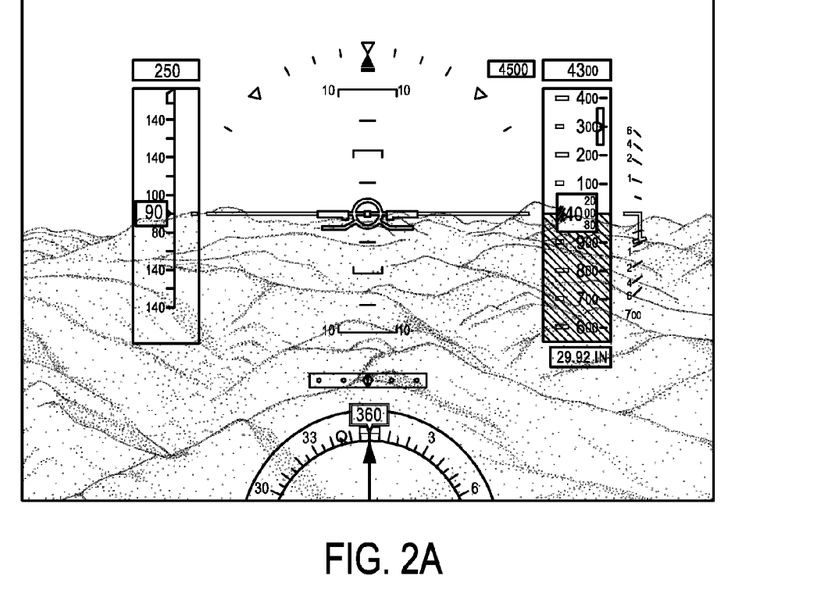
FIG. 2A provides an exemplary depiction of an HDD unit presenting tactical information to the pilot or flight crew against the background of a three-dimensional image of terrain and sky.
Figure 3A:
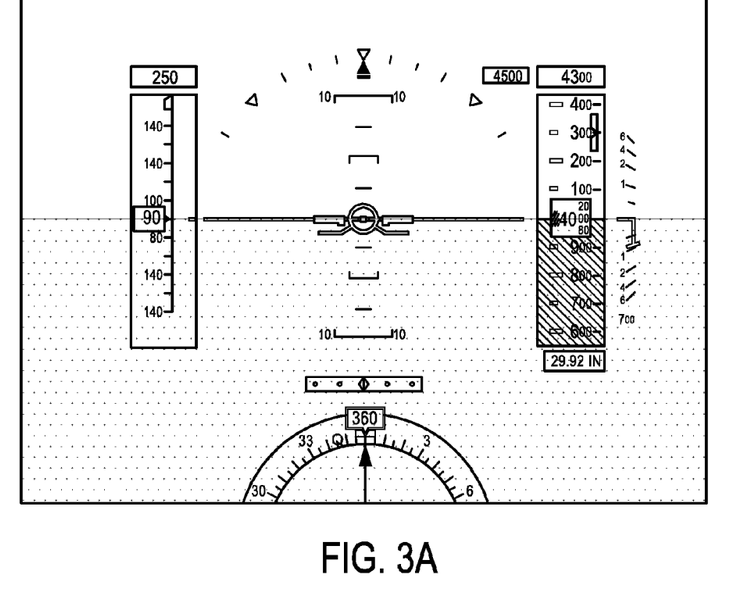
FIG. 3A provides an exemplary depiction of an HDD unit presenting tactical information to the pilot or flight crew against the background of a two-dimensional image of sky and ground.

FIG. 2A provides an exemplary depiction of an HDD unit for presenting tactical information to the pilot or flight crew against the background of a three-dimensional image of terrain and sky; an HDD unit could be employed as a display unit in a synthetic vision system, an enhanced vision system, or combination of both. FIG. 3A provides an exemplary depiction of an HDD unit for presenting tactical information to the pilot or flight crew against the classic blue/brown background of a two-dimensional image of sky/ground of an electronic attitude indicator such as, but not limited to, a PFD. It should be noted that the tactical information depicted on HDD unit has been made minimal for the sake of presentation and is not indicative of the plurality of indications or information with which it may be configured.

Returning to FIG. 1, a HUD unit 154 provides tactical information to the pilot or flight crew, in the pilot's forward field of view through the windshield, eliminating transitions between head-down and head-up flying. Similar to an HDD unit 152, a HUD unit 154 may be tailored to the desired configuration specified by a buyer or user of the aircraft.

Figure 4A:
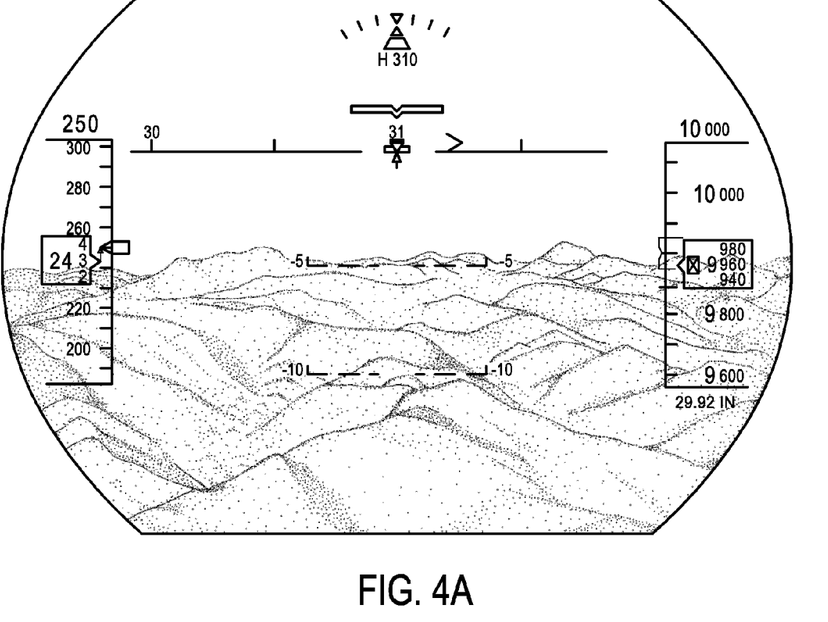
FIG. 4A provides an exemplary depiction of a HUD unit presenting tactical information to the pilot or flight crew against the background of a three-dimensional image of terrain and sky.

FIG. 4A provides an exemplary depiction of a HUD unit 154 for presenting tactical information to the pilot or flight crew against the background of a three-dimensional image of terrain and sky; a HUD unit 154 could be employed as a display unit in a synthetic vision system, an enhanced vision system, or combination of both. It should be noted that the tactical information depicted on the HUD unit 154 has been made minimal for the sake of presentation and is not indicative of the plurality of indications or information with which it may be configured.

A plurality of visual alerts is available or configurable to a manufacturer or end-user of a WAWS 100. Those skilled in the art will appreciate the ability and ease with which executable software code may be reprogrammed or modified by a manufacturer or end-user to facilitate a configuration of an alert system selected by a manufacturer or end-user without affecting or expanding the scope of the embodiments discussed herein. In the following paragraphs, examples of visual alerts are provided to illustrate the flexibility and ability with which a manufacturer or end-user may configure visual alerts as embodied herein. Although the following illustrations may provide examples that are directed to a SIGMET weather product, such visual alerts could be applied to any weather product. These illustrations are intended to provide examples of visual alerting, and are not intended to provide a limitation or an exhaustive list of the embodiments discussed herein.

As embodied herein, visual alerts may be displayed in a plurality of indications in which the background image of a display unit could be altered. For example, in FIGS. 2B and 3B, the background images of the sky portions on the HDD units of FIGS. 2A and 3A have been altered, while the terrain portions have remained the same; in FIG. 4B, the background image of the sky portion on the HUD unit of FIG. 4A has been altered while the terrain portion has remained the same. In one embodiment, the sky changes from one solid color to another. The changing of the color could indicate that the aircraft is approaching a defined weather area, has entered a weather area, or both. In another example, more than one color could be used; for example, amber or yellow could indicate the aircraft is approaching a defined weather area, and red could indicate the aircraft has entered the defined weather area. In another example, colors could remain steady, flash intermittently, or both. In another example, a portion or portions of the sky could be altered. In another example, the terrain portion could be included in the altering of the background image. In another example, alterations could depend on a weather product (e.g., SIGMET, AIRMET, etc.).

Figure 2B:
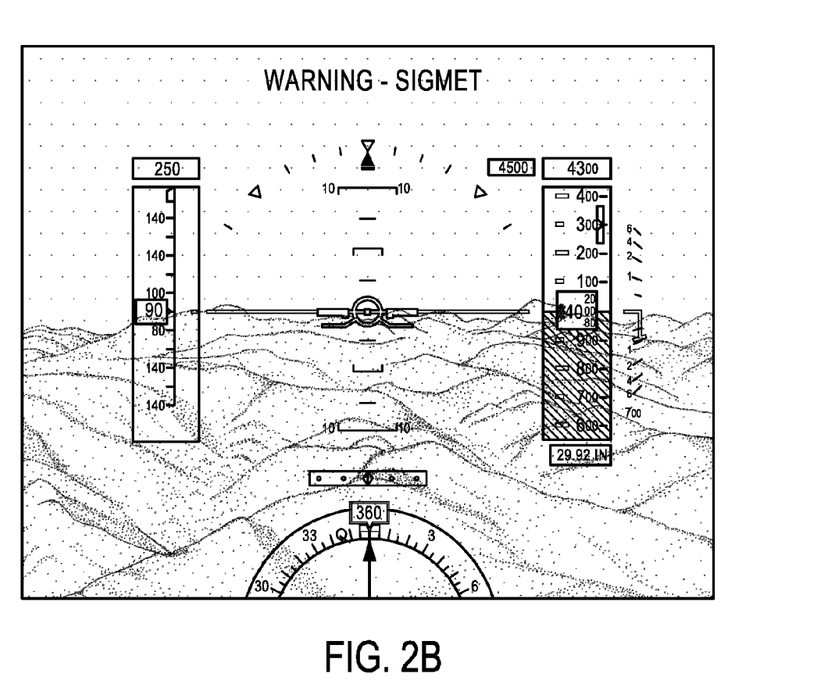
FIG. 2B provides an exemplary depiction of the HDD unit of FIG. 2A incorporating an embodiment disclosed herein.
Figure 3B:
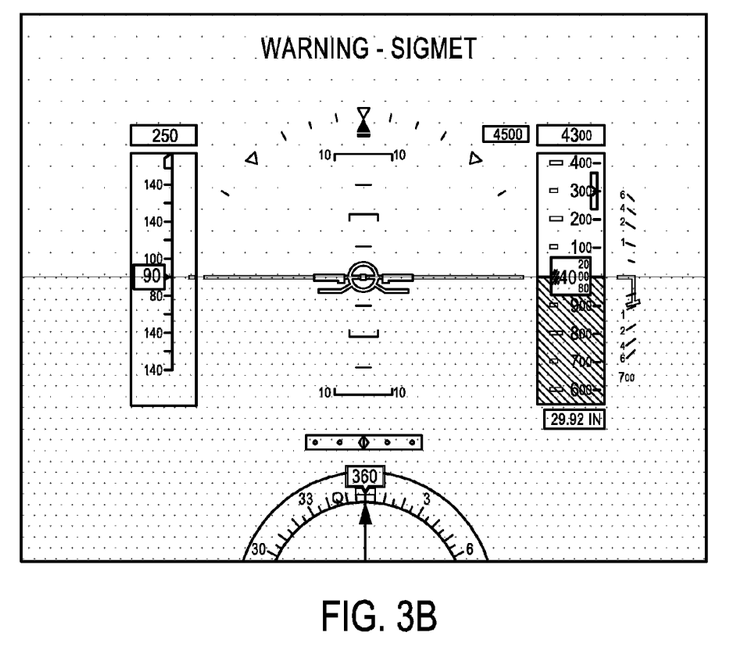
FIG. 3B provides an exemplary depiction of the HDD unit of FIG. 3A incorporating an embodiment disclosed herein.
Figure 4B:
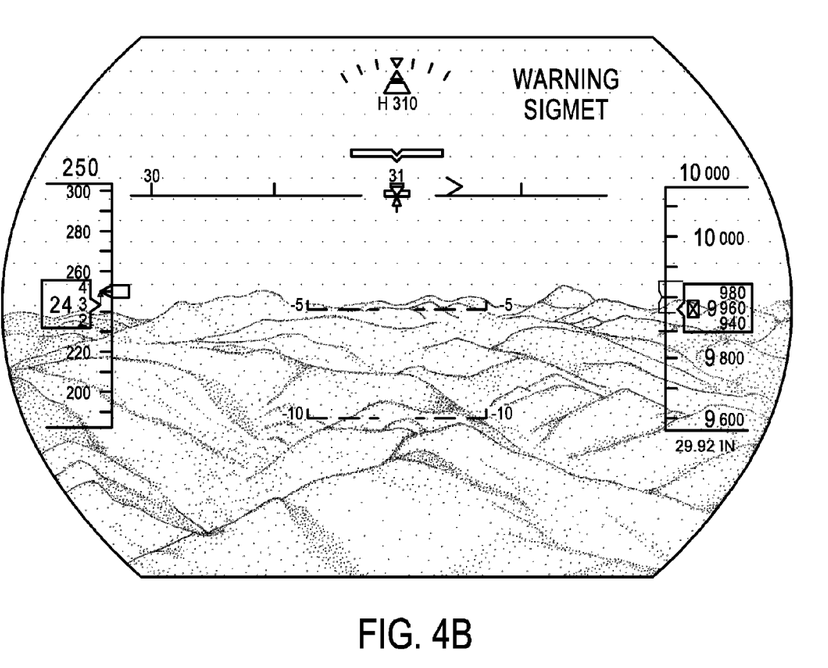
FIG. 4B provides an exemplary depiction of the HUD unit of FIG. 4A incorporating an embodiment disclosed herein.

In another embodiment herein, visual alerts may be displayed in a plurality of indications in which a text message could be displayed. In one example, a text message could display "WEATHER." In another example, a message could correspond to or be associated with a weather product: "SIGMET" could be displayed if the product is a SIGMET, and "AIRMET" could be displayed if the product is an AIRMET. "WARNING—SIGMET" or "WARNING—AIRMET" could be displayed when the condition(s) for a warning alert have been met and "CAUTION—SIGMET" or "CAUTION—AIRMET" when the condition(s) for a caution alert have been met. As shown in FIGS. 2B and 3B, a text message "WARNING—SIGMET" has been depicted on the HDD units, and as shown in FIG. 4B, a text message "WARNING SIGMET" has been depicted on the HUD unit. In another example, different colors could be used for different text; for example, "WEATHER" or "SIGMET" appearing in amber or yellow could be used to signify a caution alert, and "WEATHER" or "SIGMET" appearing in red could be used to signify a warning alert.

Returning to FIG. 1, it should be noted that the embodiments herein are not limited to these display units although the previous discussion has been drawn specifically toward an HDD unit 152 and a HUD unit 154. Visual alerts may be presented on Other Display Units 156 that are available to the pilot. Other Display Units 156 present information to him or her such as, but not limited to, a strategic display unit that displays intended future state(s) of the aircraft (e.g. intended location in space at specified times) along with information providing contextual information to the crew (e.g. terrain, navigation aids, geopolitical boundaries, airspace boundaries, etc.) about such state(s). One example of such display unit is commonly referred to as a Navigation Display. In some configurations, a strategic display unit could be part of an Electronic Flight Information System ("EFIS"). On these systems, terrain information, weather radar information, or both may be displayed simultaneously with information of other systems.

In an embodiment of FIG. 1, an alerting system 150 could comprise of an aural alert unit 158. As embodied herein, a plurality of aural alerts is available or configurable to a manufacturer or end-user. In one example, an aural alert could call out "WEATHER." In another example, an aural alert could correspond to or be associated with a weather product: "SIGMET" could be sounded if the product is a SIGMET, and "AIRMET" could be sounded if the product is an AIRMET. "Warning, SIGMET" or "Warning, AIRMET" could be sounded when the condition(s) for a warning alert have been met and "Caution, SIGMET" or "Caution, AIRMET" when the condition(s) for a caution alert have been met. In another embodiment, aural and visual alerts could be presented simultaneously. In another embodiment, the alert could be issued along with one or more recommendations and/or guidance information for responding to the alert condition including, for example, the audio and/or visual indication of "Warning, SIGMET. Turn left."

Figure 5A:
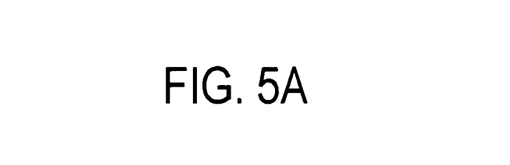
FIG. 5A provides an exemplary depiction of a non-convective SIGMET.
Figure 5B:
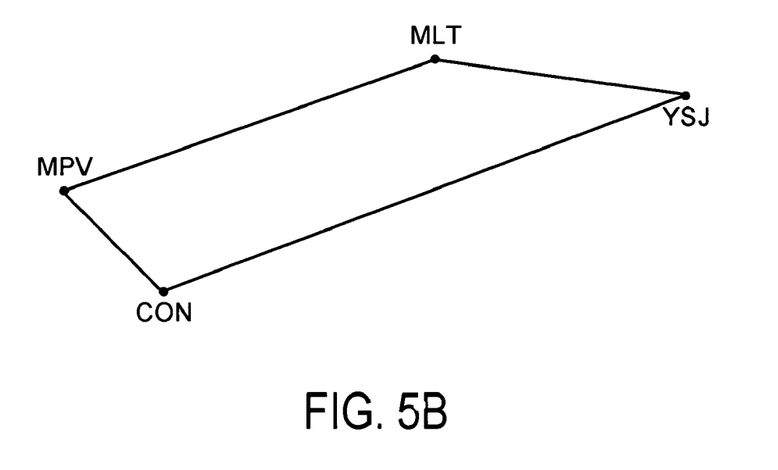
FIG. 5B illustrates a two-dimensional depiction of the horizontal delineations described in a non-convective SIGMET.
Figure 5C:
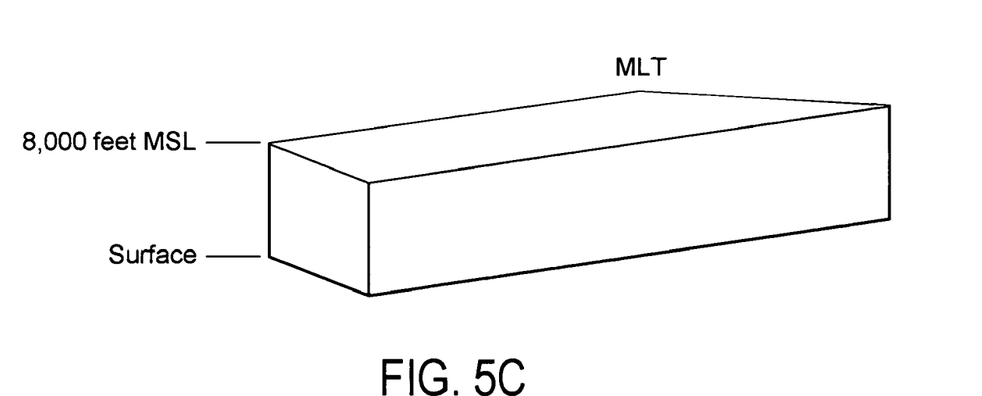
FIG. 5C illustrates a three-dimensional depiction of delineations described in a non-convective SIGMET.
Figure 6A:
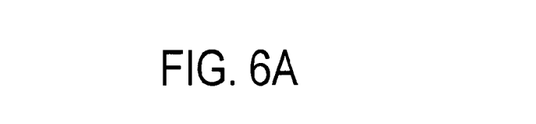
FIG. 6A provides an exemplary depiction of a convective SIGMET.
Figure 6B:
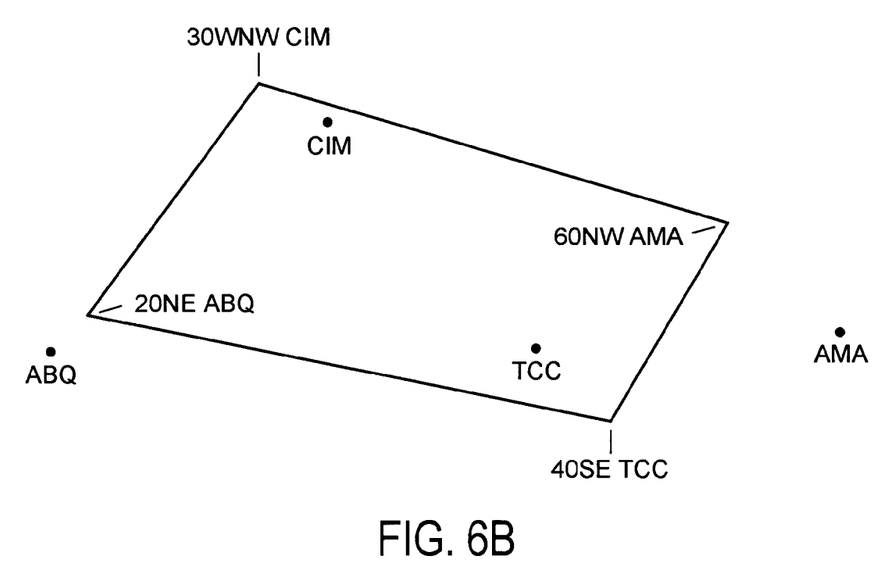
FIG. 6B illustrates a two-dimensional depiction of the horizontal delineations described in the convective SIGMET of FIG. 6A.
Figure 6C:
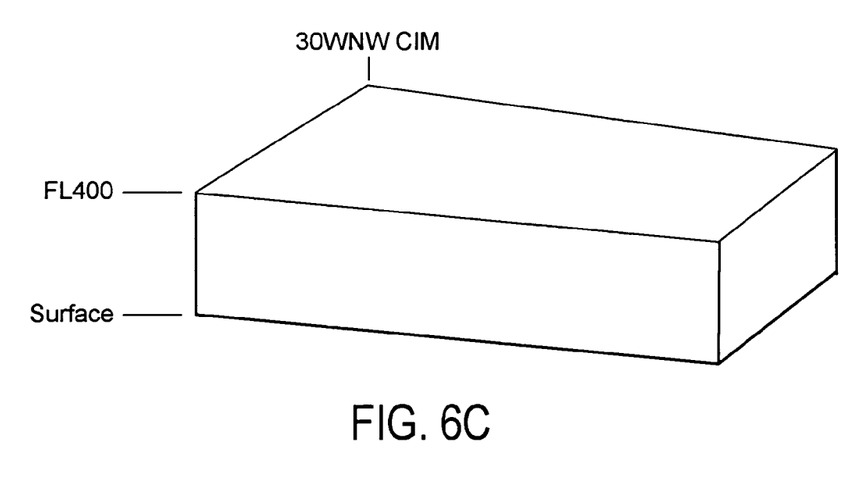
FIG. 6C illustrates a three-dimensional depiction of delineations described in the convective SIGMET of FIG. 6A.
Figure 7A:
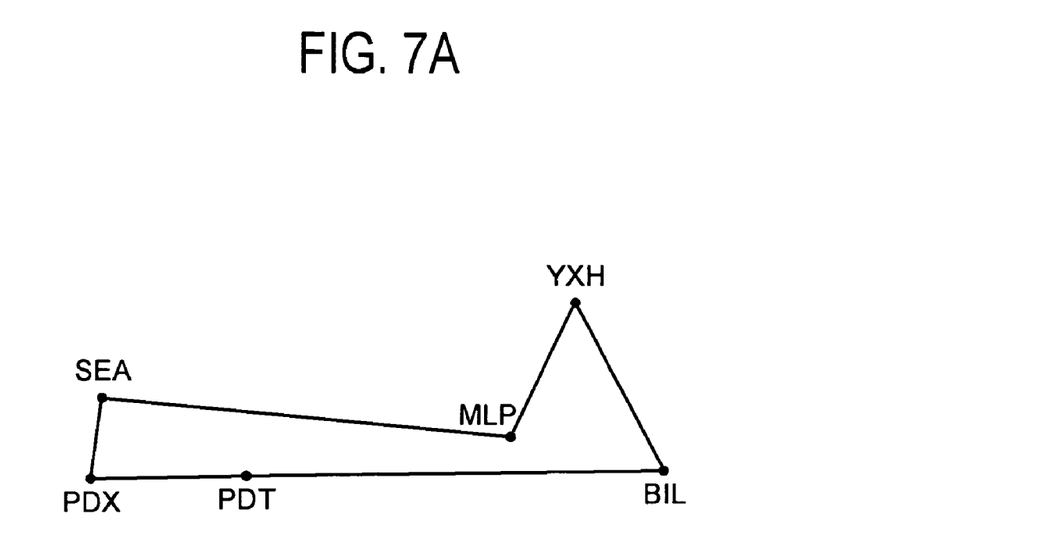
FIG. 7A provides an exemplary depiction of an AIRMET.
Figure 7B:
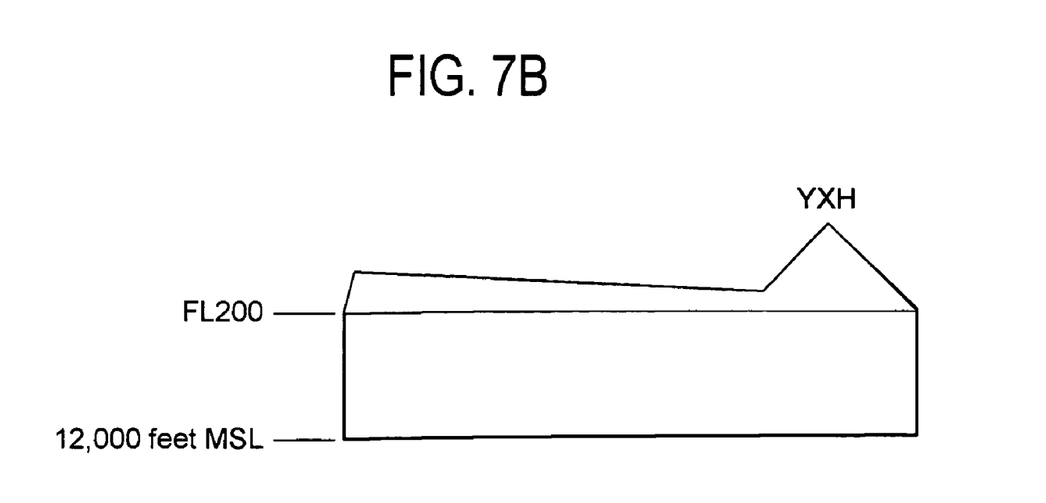
FIG. 7B illustrates a two-dimensional depiction of the horizontal delineations described in the AIRMET of FIG. 7A.

The advantages and benefits of the embodiments discussed herein may be illustrated by showing examples describing how data representative of weather conditions and data representative of aircraft position may be used to determine whether the conditions have been met to generate an alert signal in a WAWS 100. The drawings of FIGS. 5 through 7 provide three exemplary weather reports which, in part, provide the vertical or perimeter surface(s), floors, and ceilings of weather areas that delineate horizontal limits and designate altitudes of defined weather areas. For the purpose of illustration only, the surface of the Earth is shown as flat in the drawings of FIGS. 5 through 7.

FIG. 5A provides an exemplary non-convective SIGMET which provides, in part, a delineation of horizontal limits and designation of a ceiling altitude that define a weather area. The SIGMET reads as follows: "SIGMET issued for the Boston Area Forecast region on the 5th day of the month at 0600 UTC. This is the second (2nd) issuance of SIGMET series Romeo and is valid until the 5th day of the month at 1000 UTC. The affected states are Maine, New Hampshire, and Vermont. Within an area bounded from Millinocket, Maine (MLT); to St. John, New Brunswick (YSJ); to Concord, N.H. (CON); to Montpelier, Vt. (MPV); to Millinocket, Me. Occasional severe turbulence below 8,000 feet mean sea level ("MSL") due to strong northwesterly flow. Conditions are expected to continue beyond 1000 UTC." FIG. 5B illustrates a two-dimensional depiction of the horizontal delineations described in the SIGMET. FIG. 5C illustrates a three-dimensional depiction where the vertical faces of the weather area represent perimeter surfaces of the area, and the horizontal face (shown as the shaded surface) represents the ceiling. Although the "floor" of the weather area is not depicted, it is represented by the surface of the Earth bounded by the horizontal delineations.

FIG. 6A provides an exemplary convective SIGMET which provides, in part, a delineation of horizontal limits and designation of a ceiling altitude that define a weather area. The SIGMET reads as follows: "Convective SIGMET 55C is the 55th convective SIGMET issued for the central region of the US on the 25th day of the month. Valid until 1855 UTC. States affected include Texas and New Mexico. Bounded with an area from 20 miles northeast of Albuquerque (ABQ); to 30 miles west-northwest of Cimarron, N. Mex. (CIM); to 60 miles northwest of Amarillo, Tex. (AMA); to 40 miles southeast of Tucumcari, N. Mex. (TCC); to, 20 miles northeast of Albuquerque. An area of severe thunderstorms is moving from 330 degrees (to the southeast) at 25 knots. Thunderstorms tops to Flight Level 400 (approximately 40,000 feet MSL). Hail up to 2 inches in diameter and wind gusts to 70 knots are possible." FIG. 6B illustrates a two-dimensional depiction of the horizontal delineations described in the convective SIGMET, and FIG. 6C illustrates a three-dimensional depiction in a similar fashion as shown in FIG. 5C.

FIG. 7A provides an exemplary AIRMET which provides, in part, a delineation of horizontal limits and designation of ceiling and floor altitudes that define a weather area. The AIRMET reads as follows: "AIRMET for icing for Washington, Oreg., Id., and Montana. Bounded within an area from Medicine Hat, Alberta (YXH); to Mullan Pass, Id. (MLP); to Seattle, Wash. (SEA); to Portland, Oreg. (PDX); to Pendleton, Oreg. (PDT); to Billings, Mont. (BIL); to Medicine Hat, Alberta. Moderate icing between 12,000 feet MSL and Flight Level 200 (approximately 20,000 feet MSL). Conditions continuing beyond 2000 UTC through 0200 UTC." FIG. 7B illustrates a two-dimensional depiction of the horizontal delineations described in the AIRMET. FIG. 7C illustrates a three-dimensional depiction where the vertical faces of the weather area represent perimeter surfaces of the area, and the horizontal face (shown as the shaded surface) represents the ceiling. Although the "floor" of the weather area is not depicted in FIG. 7C, the floor is located at 12,000 feet MSL.

Figure 8A:
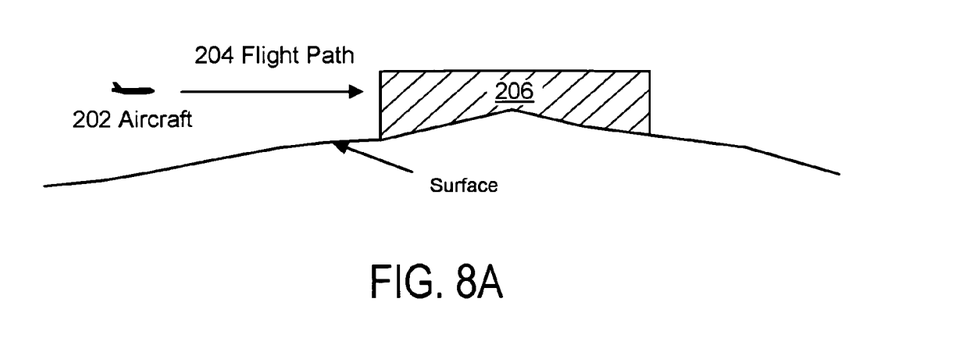
FIG. 8A depicts an aircraft approaching a defined weather area.
Figure 8B:
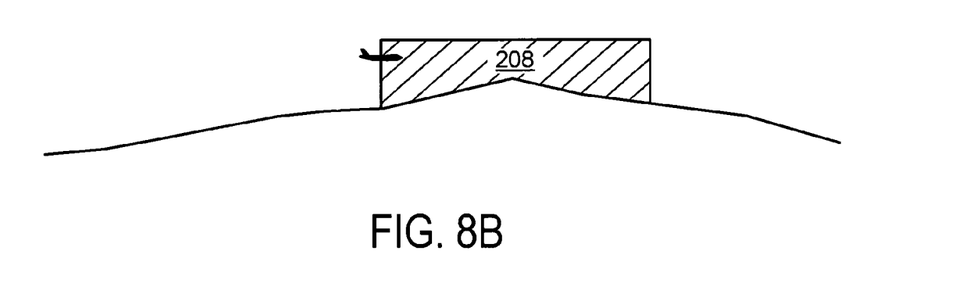
FIG. 8B provides an exemplary depiction of an event in which a first alert signal could be triggered.
Figure 8C:
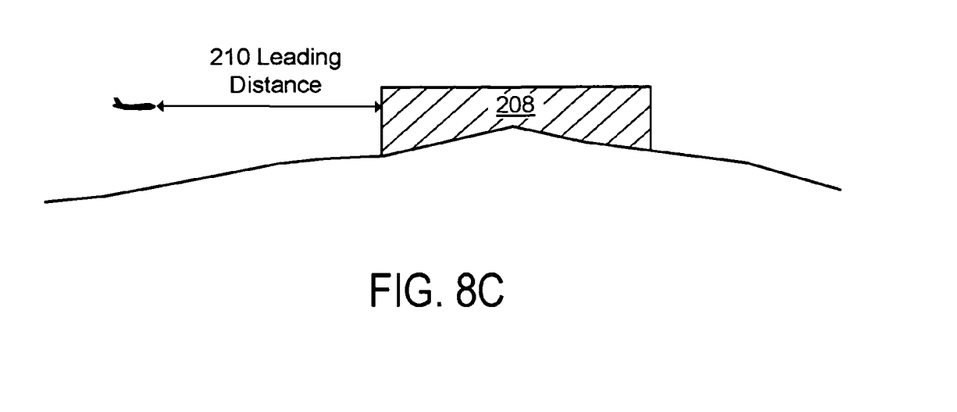
FIG. 8C provides an exemplary depiction of an event in which second alert signal could be triggered.

The drawings of FIG. 8 provide examples of conditions which could cause the generation of an alert signal in a WAWS 100 when an aircraft is operating at an altitude between the floor and ceiling of a defined weather area. FIG. 8A depicts an aircraft 202 flying in level flight along its flight path 204 and approaching a defined weather area 206. It should be noted that, in the drawings of FIG. 8, a defined weather area 206 may be the same area as a weather alert zone 208; as will be discussed below in detail, a weather alert zone 208 could include a buffer zone.

FIGS. 8B and 8C provide exemplary depictions of events in which alert signals could be triggered based upon an alert position of the aircraft. In an embodiment of FIG. 8B, the aircraft has penetrated a weather alert zone 208, i.e., the position of the aircraft falls within the boundaries of weather alert zone 208. In this embodiment, aircraft position could be an alert position. When penetration of a weather alert zone 208 does occur, i.e., an alert position of the aircraft falls within it, such occurrence could trigger a warning-type alert drawing immediate attention of the crew that the aircraft has entered a weather alert zone 208. A WA processor 140 could generate a warning alert signal and provide such signal to an alerting system 150 as a result of the penetration.

In an embodiment of FIG. 8C, the aircraft is approaching a weather alert zone 208 and has arrived at a leading distance 210 from a vertical face or perimeter surface of a weather alert zone 208. In this embodiment, aircraft position could also be an alert position. When the aircraft arrives at an alert position a leading distance 210 from the perimeter surface of a weather alert zone 208, such arrival could trigger a caution-type alert drawing immediate awareness of the crew that the aircraft is approaching a weather alert zone 208. A WA processor 140 could generate a caution alert signal and provide such signal to an alerting system 150 as a result of the aircraft arriving at an alert position.

As embodied herein, a leading distance 210 could be variable or fixed, and it could be defined, configured, or specified by a manufacturer or end-user of a WAWS 100. In one embodiment, a leading distance 210 could be set as a variable of one or more factors. For example, one factor could be time before penetrating a weather alert zone 208; if so, a leading distance 210 could be determined as a function of the speed of the aircraft. In another embodiment, a leading distance 210 could be set as a fixed distance from a boundary of a weather alert zone 208.

The drawings of FIG. 9 provide examples of conditions which could cause the generation of an alert signal in a WAWS 100 when the aircraft is operating at an altitude above the ceiling or below the floor of a weather area. FIG. 9A depicts an aircraft 212 descending along its flight path 214 and approaching a defined weather area 216 from above. It should be noted that, in the drawings of FIG. 9, a defined weather area may be the same area as a weather alert zone.

Figure 9A:
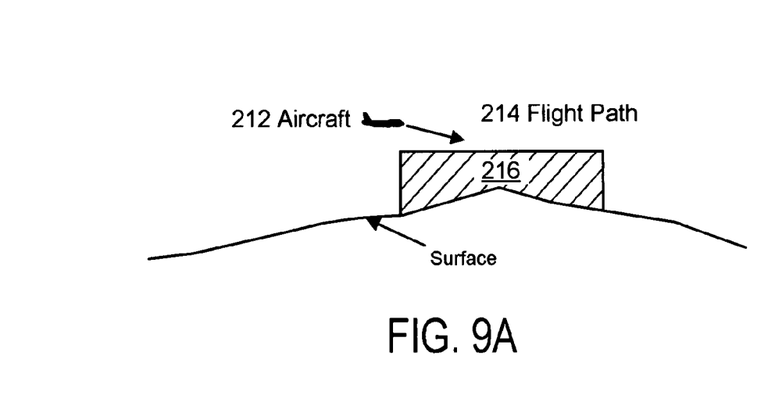
FIG. 9A depicts an aircraft approaching a defined weather area from above.
Figure 9B:
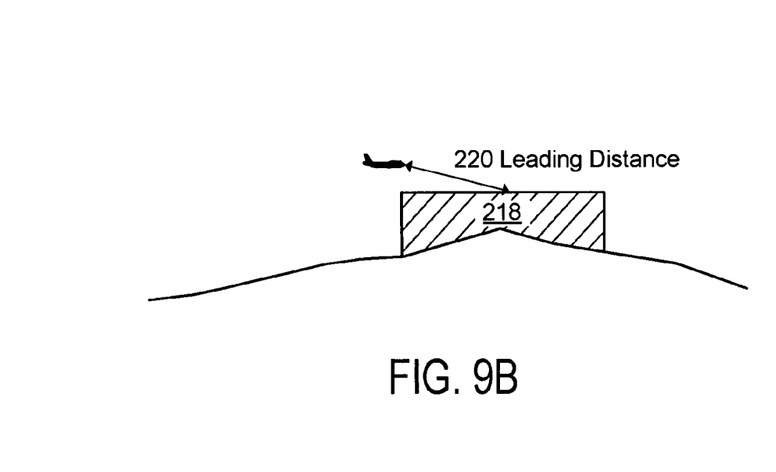
FIG. 9B provides an exemplary depiction of an aircraft that has arrived at a leading distance from a horizontal face or ceiling of a weather alert zone.

In an embodiment of FIG. 9B, the aircraft has arrived at a leading distance 220 from a horizontal face or ceiling of a weather alert zone 218 along its flight path. In this embodiment, aircraft position could also be an alert position. When the aircraft arrives at an alert position a leading distance 220 from the ceiling of a weather alert zone 218, such arrival could trigger a caution-type alert drawing immediate awareness of the crew that the aircraft is approaching a weather alert zone 218. A WA processor 140 could generate a caution alert signal and provide such signal to an alerting system 150 as a result of the aircraft arriving at an alert position.

As embodied herein, a leading distance 220 could be variable or fixed, and it could be defined, configured, or specified by a manufacturer or end-user of a WAWS 100. In one embodiment, a leading distance 220 could be set as a variable of one or more factors. For example, one factor could be time before penetrating the weather alert zone 218; if so, a leading distance 220 could be determined as a function of the speed or vertical speed of the aircraft. In another embodiment, a leading distance 220 could be set as a fixed distance from a boundary of a weather alert zone 218 along a flight path 214 or above the weather alert zone 218.

Figure 9C:
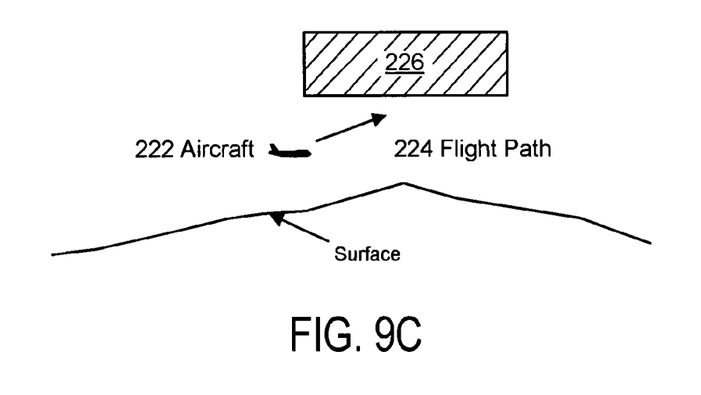
FIG. 9C provides an exemplary depiction of an aircraft approaching a defined weather area from below.

FIG. 9C depicts an aircraft 222 climbing along its flight path 224 and approaching a defined weather area 226 (and weather alert zone) from below. In an embodiment of FIG. 9D, the aircraft has arrived at a leading distance 230 from a horizontal face or floor of a weather alert zone 228 along its flight path. When the aircraft arrives at an alert position a leading distance 230 from the floor of a weather alert zone 228, such arrival could trigger a caution-type alert drawing immediate awareness of the crew that the aircraft is approaching a weather alert zone 228. A WA processor 140 could generate a caution alert signal and provide such signal to an alerting system 150 as a result of arriving at an alert position.

Figure 9D:
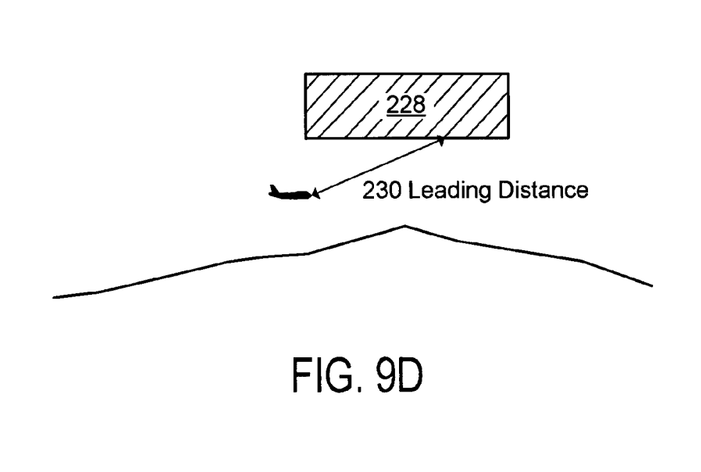
FIG. 9D provides an exemplary depiction of an aircraft that has arrived at a leading distance from a horizontal face or floor of a weather alert zone.

As embodied herein, a leading distance 230 could be variable or fixed, and it could be defined, configured, or specified by a manufacturer or end-user of a WAWS 100. In one embodiment, a leading distance 230 could be set as a variable of one or more factors. For example, one factor could be time before penetrating a weather alert zone 228; if so, a leading distance 230 could be determined as a function of the speed or vertical speed of the aircraft. In another embodiment, a leading distance 230 could be set as a fixed distance from a boundary of a weather alert zone 228 along a flight path 224 or below the weather alert zone 228.

The drawings of FIG. 10 provide examples of conditions which could cause the generation of an alert signal in a WAWS 100 when a weather alert zone includes a buffer zone. As embodied herein, a buffer zone could delineate horizontal limits and designate altitudes. A buffer zone could provide vertical or perimeter surface(s) and ceilings or floors extending from those of a defined weather area to provide a buffer area in one or more directions around the defined weather area. As embodied herein, dimensions of a buffer zone could be variable or fixed, and it could be defined, configured, or specified by a manufacturer or end-user of a WAWS 100. In one embodiment, dimensions of a buffer zone could be set as a variable of one or more factors. For example, one factor could be time before an aircraft penetrating a defined weather area; if so, delineated horizontal limits could be determined as a function of the speed of the aircraft. In another embodiment, delineated horizontal limits could be set as a fixed distance from a boundary of a defined weather area.

Figure 10A:
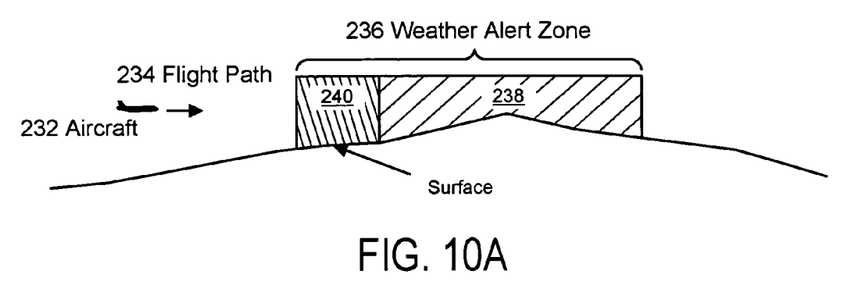
FIG. 10A depicts an aircraft approaching a weather alert zone comprised of a defined weather area 28 and a buffer zone.

In an embodiment of FIG. 10A, an aircraft 232 is flying in level flight along its flight path 234 and approaching a weather alert zone 236 comprised of a defined weather area 238 and a buffer zone 240. As embodied herein, a buffer zone 240 could have delineated horizontal limits extending outward from the horizontal limits delineated for a defined weather area 238. As discussed above, the horizontal limits could be variable or fixed. For example, such limits could be determined as a function of speed or set as a fixed distance. As embodied herein, a buffer zone 240 could designate an altitude as a ceiling. For the purpose of illustration only and not as a limitation of the embodiments herein, the designated ceiling of a buffer zone 240 shown in FIG. 10A has been presented as being the same as a defined weather area 238.

Figure 10B:
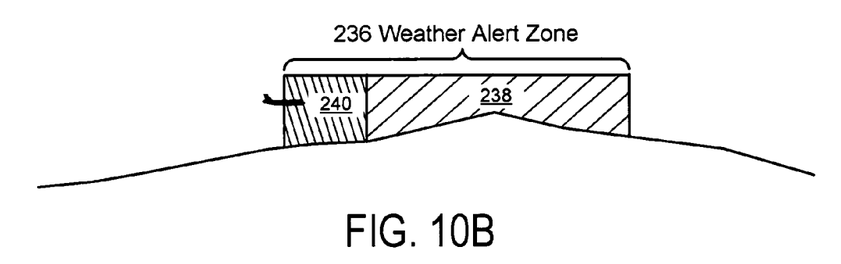
FIG. 10B provides an exemplary depiction of an aircraft that has penetrated a buffer zone of a weather alert zone.

In an embodiment of FIG. 10B, the aircraft has penetrated a buffer zone 240 of a weather alert zone 236 of FIG. 10A, i.e., the aircraft falls within the boundaries of weather alert zone 236. When penetration of a weather alert zone 236 does occur, such occurrence could trigger a caution-type alert drawing immediate awareness of the crew that the aircraft has entered a weather alert zone 236 and is approaching a defined weather area 238. A WA processor 140 could generate a caution alert signal and provide such signal to an alerting system 150 as a result of the penetration. If the aircraft continues flying in the same direction and penetrates the defined weather area 238, such occurrence could trigger a warning-type alert drawing immediate attention of the crew that the aircraft has entered a defined weather area 238. A WA processor 140 could generate a warning alert signal and provide such signal to an alerting system 150 as a result of the second penetration.

Figure 10C:
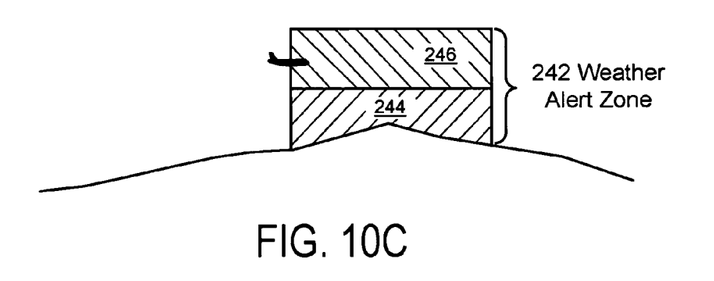
FIG. 10C provides an exemplary depiction of a weather alert zone comprised of a defined weather area and a buffer zone.

FIG. 10C depicts a weather alert zone 242 comprised of a defined weather area 244 and a buffer zone 246. As embodied herein, a buffer zone 246 could extend above a designated ceiling of a defined weather area 244. From the discussion above, a ceiling of a buffer zone 246 could be variable or fixed. For example, the ceiling of a buffer zone 246 could be determined as a function of speed along a descending flight path or vertical speed, or could be set as a fixed distance from the ceiling of a defined weather area 244 along a flight path or as a fixed distance above the ceiling of a defined weather area 244. For the purpose of illustration only and not as a limitation of the embodiments herein, the horizontal limits delineated for buffer zone 246 shown in FIG. 10C are the same as the defined weather area 244.

In an embodiment of FIG. 10C, the aircraft has penetrated a buffer zone 246 of a weather alert zone 242, i.e., the aircraft falls within the boundaries of weather alert zone 242. Such occurrence could trigger a caution-type alert drawing immediate awareness of the crew that the aircraft has entered a weather alert zone 242. A WA processor 140 could generate a caution alert signal and provide such signal to an alerting system 150 as a result of the penetration. Moreover, if the aircraft descends and penetrates the defined weather area 244, such occurrence could trigger a warning-type alert drawing immediate attention of the crew that the aircraft has entered a defined weather area 244. A WA processor 140 could generate a warning alert signal and provide such signal to an alerting system 150 as a result of the second penetration.

Figure 10D:
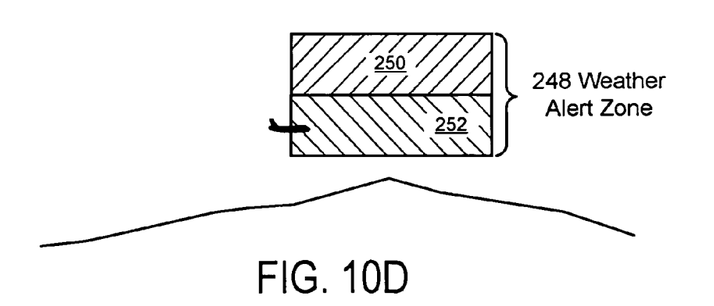
FIG. 10D provides an exemplary depiction of a weather alert zone comprised of a defined weather area and a buffer zone.

FIG. 10D depicts a weather alert zone 248 comprised of a defined weather area 250 and a buffer zone 252. As embodied herein, a buffer zone 252 could extend below a designated floor of a defined weather area 250. From the discussion above, a floor of a buffer zone 252 could be variable or fixed. For example, the floor of a buffer zone 252 could be determined as a function of speed along a climbing flight path or vertical speed, or could be set as a fixed distance from the floor of a defined weather area 250 along a flight path or as a fixed distance below the floor of a defined weather area 250. For the purpose of illustration only and not as a limitation of the embodiments herein, the horizontal limits delineated for a buffer zone 252 shown in FIG. 10D are the same as the defined weather area 250.

In an embodiment of FIG. 10D, the aircraft has penetrated a buffer zone 252 of a weather alert zone 248, i.e., the aircraft falls within the boundaries of weather alert zone 248. Such occurrence could trigger a caution-type alert drawing immediate awareness of the crew that the aircraft has entered a weather alert zone 248. A WA processor 140 could generate a caution alert signal and provide such signal to an alerting system 150 as a result of the penetration. Moreover, if the aircraft climbs and penetrates the defined weather area 250, such occurrence could trigger a warning-type alert drawing immediate attention of the crew that the aircraft has entered a defined weather area 250. A WA processor 140 could generate a warning alert signal and provide such signal to an alerting system 150 as a result of the second penetration.

Figure 11:
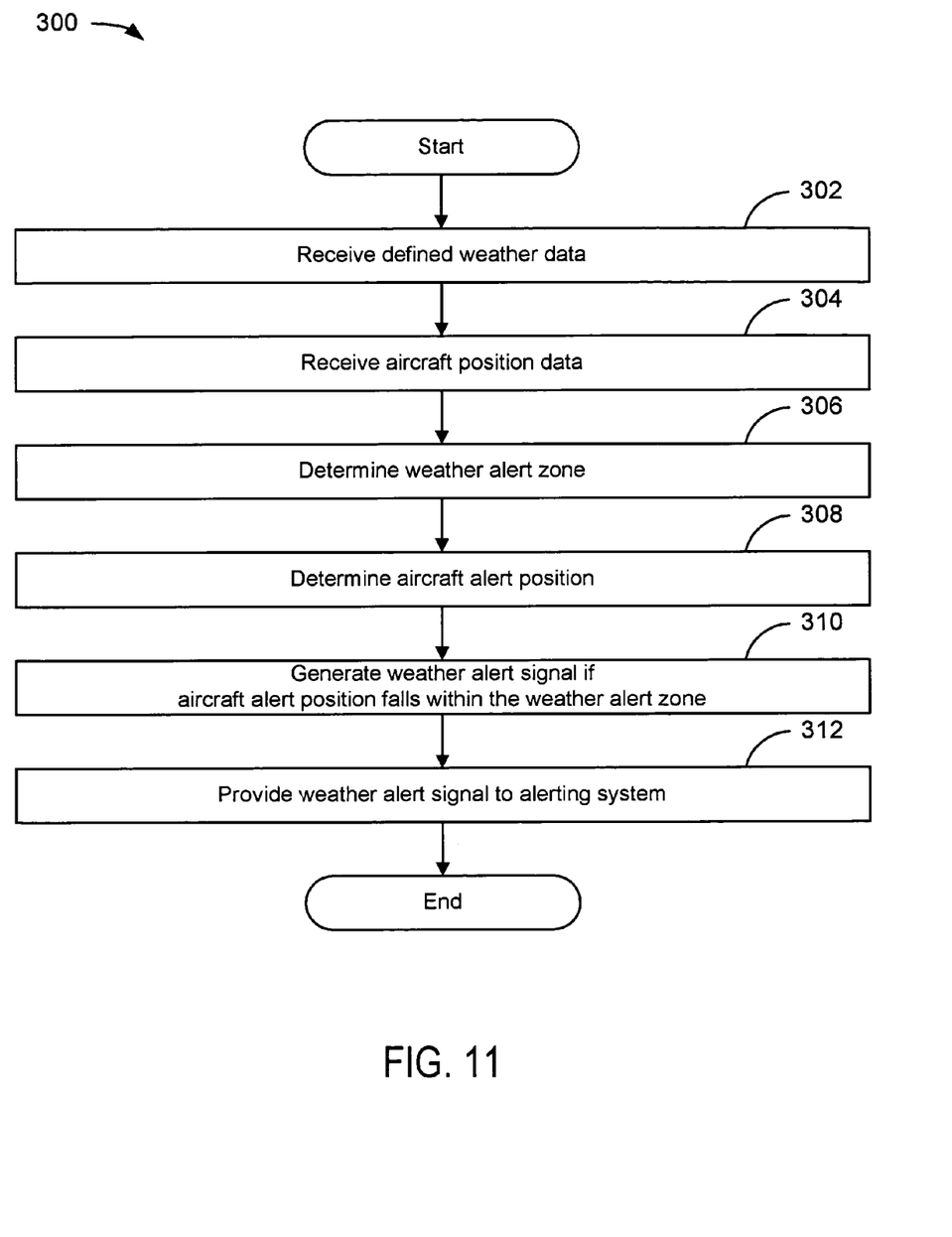
FIG. 11 depicts a flowchart of an example of a method for generating an alert signal in a WAWS.

FIG. 11 depicts a flowchart 300 of an example of a method for generating an alert signal in a WAWS 100. The flowchart begins with module 302 with receiving of weather data representative of a defined weather area; such data could be provided by a datalink system 130. The flowchart continues with module 304 with receiving of aircraft position data which could be provided from a navigation system 110. The flowchart continues with module 306 with determining of a weather alert zone as a function of data representative of a defined weather area. In one embodiment, a weather alert zone could be a defined weather area. In another embodiment, a weather alert zone could include a buffer zone; that is, a weather alert zone could be determined as a function of a defined weather area and a buffer zone. As embodied herein, the dimensions or size of a buffer zone could be fixed or variable. If variable, the buffer zone could be determined as a function of speed 118, vertical speed 120, or a combination of both.

The flowchart continues with module 308 with the determining of an aircraft alert position as a function of the aircraft position data. In one embodiment, aircraft alert position could be the actual aircraft position. In another embodiment, an aircraft alert position could be projected a leading distance from the aircraft position; that is, aircraft alert position could be determined as a function of aircraft position and a leading distance. As embodied herein, the leading distance could be fixed or variable. If variable, the leading distance could be determined as a function of speed 118, vertical speed 120, or a combination of both. In another embodiment, an aircraft alert position could be determined as a function of aircraft position and a leading distance while, at the same time, a weather alert zone could be determined as a function of a defined weather area and a buffer zone.

The flowchart continues with module 310 with generating a weather alert signal if the aircraft alert position falls within a weather alert zone; that is, the aircraft alert position has penetrated a weather alert zone. The flowchart continues with module 312 with providing the weather alert signal to an alerting system 150. As embodied herein, an alerting system comprises of at least one alerting unit including, but not limited to, an HDD unit 152, a HUD unit 154, Other Display Units 156, and an aural alert unit 158. In an additional embodiment, a display unit could display a visual alert, an aural alert unit could sound an alert, or both. As embodied herein, a visual alert displayed on a display unit could comprise an alert message, the altering of a displayed image, or both. For example, a message "WEATHER" could be depicted on an HDD unit, a HUD unit, or both; the sky portion of an HDD unit, or a HUD unit could be altered; or both. Moreover, an aural alert "WEATHER" could be sounded, either separately or simultaneously, with a visual alert.

In an additional embodiment, the weather data could contain data representative of a weather product. If so, a generated weather alert signal could include the weather product data, and such signal could be provided to an alerting system 150. As a result, a visual alert could display the weather product data, an aural alert could sound the weather product data, or both. For example, a message "WEATHER—SIGMET" or "SIGMET" could be depicted on a visual display unit; the sky portion could be altered in a manner indicative of a weather product SIGMET; or both. Moreover, an aural alert "WEATHER" could be sounded, either separately or simultaneously, with a visual alert. Then, the flowchart proceeds to the end.

It should be noted that the method steps described above could be embodied in computer-readable media including, but not limited to, computer instruction code. It shall be appreciated to those skilled in the art that not all method steps must be performed, nor must they be performed in the order stated. As embodied herein, the actions that could be performed by a WA processor 140 are included as method steps.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements as falling within the true spirit and scope of the present invention.

What is claimed is:

1. A system for generating an alert signal in an aircraft system, said system comprising:
    a datalink system through which externally-sourced weather data is transmitted to an aircraft;
    a source of navigation data; and
    a weather alert processor configured to
        receive the externally-sourced weather data from the datalink system, where
            such externally-sourced weather data is representative of a defined, three-dimensional weather area comprised of
            delineated horizontal limits,
            a designated ceiling altitude, and
            a designated floor altitude where a floor of the defined, three-dimensional weather area is other than the surface of the Earth,
        determine the boundaries of a three-dimensional weather alert zone as a function of the defined, three-dimensional weather area, where
            the three-dimensional weather alert zone is comprised of a plurality of surfaces, where
                at least one surface is a vertically-disposed perimeter surface,
                one surface is a horizontally-disposed ceiling surface, and
                one surface is a horizontally-disposed floor surface where a floor of the defined, three-dimensional weather area is other than the surface of the Earth,
        receive navigation data representative of aircraft position,
        determine an alert position as a function of the aircraft position,
        generate a weather alert signal if the alert position falls within the plurality of surfaces of the three-dimensional weather alert zone, and
        provide the weather alert signal to an alerting system comprised of at least one alerting unit.

2. The system of claim 1, wherein the function for determining the plurality of surfaces of the three-dimensional weather alert zone includes data representative of a buffer zone.

3. The system of claim 2, where the size of the buffer zone is variable and determined as a function of the speed of the aircraft, vertical speed of the aircraft, or both.

4. The system of claim 1, wherein the function for determining the alert position includes a leading distance.

5. The system of claim 4, wherein the leading distance is variable and determined as a function of the speed of the aircraft, vertical speed of the aircraft, or both.

6. The system of claim 4, wherein the function for determining the plurality of surfaces of the three-dimensional weather alert zone includes data representative of a buffer zone.

7. The system of claim 1, wherein
    each alerting unit is comprised of
        a display unit for presenting an alert message, or
        an aural alert unit for sounding an alert.

8. The system of claim 1, wherein
    at least one alerting unit is a display unit for presenting a background image of sky and terrain, where
        the background image of at least a portion of the sky is altered as the weather alert signal is provided to the display unit.

9. The system of claim 1, wherein
    the externally-sourced weather data is comprised of data representative of a weather product,
    the generation of the weather alert signal includes data representative of a weather product, and
    each alerting unit is comprised of
        a display unit for presenting an alert message corresponding to the weather product, or
        an aural alert unit for sounding an alert corresponding to the weather product.

10. The system of claim 1, wherein
    the externally-sourced weather data is comprised of data representative of a weather product,
    the generation of the weather alert signal includes data representative of the weather product, and
    at least one alerting unit is a display unit for presenting a background image of sky and terrain, where
        the background image of at least a portion of the sky is altered as the weather alert signal is provided to the display unit.

11. A method for generating an alert signal in an aircraft system, said method comprising:
    performing the following elements, where such elements are performed by a weather alert processor:

receiving externally-sourced weather data from the datalink system, where
such externally-sourced weather data is representative of a defined, three-dimensional weather area comprised of
delineated horizontal limits,
a designated ceiling altitude, and
a designated floor altitude where a floor of the defined, three-dimensional weather area is other than the surface of the Earth,
determining the boundaries of a three-dimensional weather alert zone as a function of the defined, three-dimensional weather area, where
the three-dimensional weather alert zone is comprised of a plurality of surfaces, where
at least one surface is a vertically-disposed perimeter surface,
one surface is a horizontally-disposed ceiling surface, and
one surface is a horizontally-disposed floor surface where a floor of the defined, three-dimensional weather area is other than the surface of the Earth,
receiving navigation data representative of aircraft position;
determining an alert position as a function of the aircraft position;
generating a weather alert signal if the alert position falls within the plurality of surfaces of the three-dimensional weather alert zone; and
providing the weather alert signal to an alerting system comprised of at least one alerting unit.

12. The method of claim 11, wherein the function for determining the plurality of surfaces of the three-dimensional weather alert zone includes data representative of a buffer zone.

13. The method of claim 12, where the size of the buffer zone is variable and determined as a function of the speed of the aircraft, vertical speed of the aircraft, or both.

14. The method of claim 11, wherein the function for determining the alert position includes a leading distance.

15. The method of claim 14, wherein the leading distance is variable and determined as a function of the speed of the aircraft, vertical speed of the aircraft, or both.

16. The method of claim 14, wherein the function for determining the plurality of surfaces of the three-dimensional weather alert zone includes data representative of a buffer zone.

17. The method of claim 11, wherein
each alerting unit that is a display unit presents an alert message when provided with the weather alert signal, and
each alerting unit that is an aural alert unit sounds an alert when provided with the weather alert signal.

18. The method of claim 11, wherein
at least one alerting unit is a display unit for presenting a background image of sky and terrain, where
the background image of at least a portion of the sky is altered as the weather alert signal is provided to the display unit.

19. The method of claim 11, wherein
each alerting unit that is a display unit presents an alert message when provided with the weather alert signal, and
each alerting unit that is an aural alert unit sounds an alert when provided with the weather alert signal, wherein
the externally-sourced weather data is compromised of data representative of the weather product, and
the generation of the weather alert signal includes the data representative of the weather product.

20. The method of claim 11, wherein
the externally-sourced weather data is comprised of data representative of a weather product,
the generation of the weather alert signal includes data representative of the weather product, and
at least one alerting unit is a display unit for presenting a background image of sky and terrain, where
the background image of at least a portion of the sky is altered as the weather alert signal is provided to the display unit.

\* \* \* \* \*